United States Patent
Sekiguchi et al.

(10) Patent No.: US 6,400,539 B1
(45) Date of Patent: Jun. 4, 2002

(54) INVERTER DEVICE AND MOTOR DRIVING DEVICE PROVIDED WITH INRUSH PREVENTION CIRCUIT

(75) Inventors: Syuichi Sekiguchi; Mutsuo Tokashiki, both of Funabashi; Tomoya Kamezawa, Narashino, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/678,200

(22) Filed: Oct. 4, 2000

(30) Foreign Application Priority Data

Oct. 6, 1999 (JP) .............................. 11-285138

(51) Int. Cl.[7] .................................. F21V 7/04

(52) U.S. Cl. ................ 361/31; 361/93.1; 361/187; 323/908

(58) Field of Search .................. 318/635; 388/903; 361/31, 87, 93.1, 187; 323/908; 363/56.03

(56) References Cited

U.S. PATENT DOCUMENTS 5,944,635 A * 8/1999 Bulter, Jr. .................. 482/54

FOREIGN PATENT DOCUMENTS

| JP | 3-3668 A | * | 1/1991 |
| JP | 06 952566 | | 3/1994 |
| JP | 10 023740 | | 1/1998 |
| JP | 10 042551 | | 5/1998 |
| JP | 10 271668 | | 1/1999 |

* cited by examiner

*Primary Examiner*—Shawn Riley
(74) *Attorney, Agent, or Firm*—Antonelli, Terry, Stout & Kraus, LLP

(57) ABSTRACT

An inverter device and a motor driving device are arranged to have a rush preventing circuit for preventing rush current from being flown in a smoothing circuit when the power is turned on. The rush preventing circuit includes a current-limiting means for limiting rush current, a plurality of semiconductor switching elements, a rush preventing circuit driving circuit for driving these semiconductor switching elements, and those semiconductor switching elements being connected in parallel to each other.

9 Claims, 5 Drawing Sheets

INVERTER DEVICE AND MOTOR DRIVING DEVICE PROVIDED WITH INRUSH PREVENTION CIRCUIT

BACKGROUND OF THE INVENTION

The present invention relates to an inverter device and a motor driving device, and more particularly to an inverter device and motor driving device provided with an inrush current prevention circuit.

The conventional first type of inverter device includes a smoothing circuit for smoothing a power supply for a main circuit, an inrush current prevention circuit for preventing an inrush current from flowing into the smoothing circuit when the power supply for the main circuit is turned on and an inverter section which receives the current from the smoothing circuit, the inrush current prevention circuit being a relay or an electromagnetic contactor.

Moreover, a recent second type of inverter device with a small output power includes a smoothing circuit for smoothing a waveform of a power supply for a main circuit, an inrush current prevention circuit for preventing an inrush current from flowing into the smoothing circuit when the power supply for the main circuit is turned on, and an inverter section which receives a signal from the smoothing circuit, the inrush prevention circuit being a semiconductor element such as a thyristor. This inverter device uses a semiconductor module integrally composed of converters on the input and the output sides and a thyristor in the inrush prevention circuit.

In turn, the description will be oriented to the inrush prevention circuit used for this inverter device. In FIG. 1, a reference number 1 denotes an AC power supply. A reference number 2 denotes a rectifying circuit composed of a diode connected in a three-phase bridge. A reference number 7 denotes a smoothing circuit. A reference number 8 denotes an inverter section. A reference number 9 denotes a motor. A reference number 20 denotes circuit.

The AC power supply 1 is a commercial power supply and serves to supply a three-phase AC power. The rectifying circuit 2 serves to convert a three-phase AC power supplied from the AC power supply into direct current. The circuit 2 composes a DC power-supply for a main circuit.

The inrush current prevention circuit 20 serves to prevent the inrush current from flowing into the smoothing circuit 7 when the power supply is turned on and is located between the rectifying circuit 2 and the smoothing circuit 7. The smoothing circuit 7, composed of a smoothing capacitor, serves to smooth the DC voltage outputted from the rectifying circuit 2 and then to supply the smoothed voltage into the inverter section 8. The inverter section 8 is connected to semiconductor switching elements such as IGBTs connected in a three-phase bridge so that those semiconductor switching elements may be turned on and off by a control circuit (not shown) for driving the motor 9. This motor 9 is a three-phase inductive motor.

In the inrush current prevention circuit 20, a reference number 3 denotes a current-limiting resistor. A reference number 4 denotes a thyristor. A reference number 6 denotes a control unit for the inrush current prevention circuit. A reference number 10a denotes a resistor between an anode and a gate. A reference number 10b denotes a resistor between a gate and a cathode. A reference number 11 denotes a gate resistor for a photo thyristor. A reference number 12 denotes a photo thyristor. A reference number 15 denotes a power supply for the control unit for the inrush current prevention circuit. The thyristor 4 is independent and is connected in parallel to the current-limiting resistor 3. The photo thyristor 12 is located between the resistor 10a and the gate of the thyristor 4. The gate of the thyristor 4 is connected to a junction between the cathode of the photo thyristor 12 and the resistor 10b.

The inverter device concerned with the prior art is described in JP-A-3-3668, for example.

The first type of Prior Art inverter device has a disadvantage in that its characteristics are varied according to the input frequency because coils are used for the relay of the inrush current prevention circuit and the electromagnetic contactor. For example, a constraint is placed on the receiving voltage of the inverter. Because of the use of a mechanical contact, the life of the contactor is limited. Further, the production of the mechanical contact is very costly.

The second type of Prior Art inverter device uses a single semiconductor switching element for the inrush current prevention circuit and is disadvantageous because of the capacitance and the endurance of the semiconductor switching element.

The high-power thyristor with a current capacity greater than 1000 A is mainly made as a pressure type device, while the semiconductor switching element of the 1000 A class of the IGBT (Insulated Gate Bipolar Transistor) often used as the semiconductor switching element of the inverter section is mainly made as a module type. This module type IGBT semiconductor switching element is mounted on a cooling fan. Hence, if the thyristor of the inrush current prevention circuit is located in the same box as the semiconductor switching element of the inverter section, the module type thyristor is more convenient. However, the maximum current of the module type thyristor is limited to about 400 A because of the yield-rate of the chips and so on.

SUMMARY OF THE INVENTION

It is an object of the present invention to provide an inverter device and a motor driving device which may be arranged to apply a semiconductor switching element to the an inrush current prevention circuit of the inverter device with a large capacitance and may be made inexpensively and highly reliably.

In carrying out the object, according to a first aspect of the invention, an inverter device includes a smoothing circuit for smoothing current of a power supply for a main circuit, an inrush current prevention circuit for preventing an inrush current from flowing into the smoothing circuit when the power supply for the main circuit is turned on, and an inverter section which receives a signal from the smoothing circuit and drives the motor. The inrush current prevention circuit includes current-limiter for limiting the inrush current, a plurality of semiconductor switching elements, and a driving circuit for the inrush current prevention circuit for driving these semiconductor switching elements. The semiconductor switching elements are connected in parallel to each other.

According to a second aspect of the invention, the plurality of semiconductor switching elements of the inrush current prevention circuit are connected in series with each other.

According to a third aspect of the invention, some of the semiconductor switching elements of the inrush current prevention circuit are connected in series with each other, and some combinations of the switching element circuits connected in series are in turn connected in parallel.

According to a fourth aspect of the invention, some of the semiconductor switching elements of the inrush current prevention circuit are connected in parallel with each other, and some parallel connections of the switching element circuits are in turn connected in series.

According to a fifth aspect of the invention, the driving circuit for the inrush current prevention circuit includes a DC power supply for the inrush current prevention circuit and a current-limiting resistor. The voltage of the DC power supply for the inrush current prevention circuit and the resistance of the current-limiting resistor may be set so that all of the semiconductor switching elements may be turned-on in the range of a given ambient temperature of the inverter device.

According to a sixth aspect of the invention, the plurality of semiconductor switching elements of the inrush current prevention circuit are connected in parallel to each other and the DC power supply for the inrush current prevention circuit is provided in the driving circuit for the inrush current prevention circuit.

According to a seventh aspect of the invention, the plurality of semiconductor switching elements of the inrush current prevention circuit are connected in parallel to each other, and the driving circuit for the inrush current prevention circuit includes a DC power supply for the inrush current prevention circuit and a current-limiting resistor so that the DC power supply for the inrush current prevention circuit may be connected to a trigger terminal of the semi-conductor switching element through the current-limiting resistor.

According to an eighth aspect of the invention, the DC power supply for the inrush current prevention circuit is connected to the trigger terminals of the semiconductor switching elements through the current limiting resistors.

According to a ninth aspect of the invention, the DC power supply for the inrush current prevention circuit is connected to the trigger terminal through the photo thyristor.

According to a tenth aspect of the invention, a motor driving device includes a motor, an inverter device, and a control device, the inverter device including a smoothing circuit for smoothing a power supply for a main circuit, an inrush current prevention circuit for preventing inrush current from flowing into the smoothing circuit when the power supply for the main circuit is turned on, and an inverter section for receiving the current from the smoothing circuit for driving the motor, the inrush current prevention circuit including a current-limiter for limiting the inrush current, a plurality of semiconductor switching elements, and a driving circuit for the inrush current prevention circuit for driving these semiconductor switching elements, the semiconductor switching elements of the inrush current prevention circuit being connected in parallel with each other, the driving circuit for the inrush current prevention circuit including a DC power supply for the inrush current prevention circuit and a current-limiting resistor, the DC power supply for the inrush current prevention circuit being connected to the trigger terminal of the semiconductor switching element through the current limiting resistor, and the control device serving to control the inverter section and the driving circuit for the inrush current prevention circuit.

DESCRIPTION OF THE EMBODIMENTS

Hereafter, the embodiments of the invention will be described with reference to the appended drawings. The arrangements and the descriptions common to the first embodiment will be partially eliminated in the following embodiment. Further, numbers in the embodiment and conventional drawings the same reference numbers indicate the same components.

Figure 1:
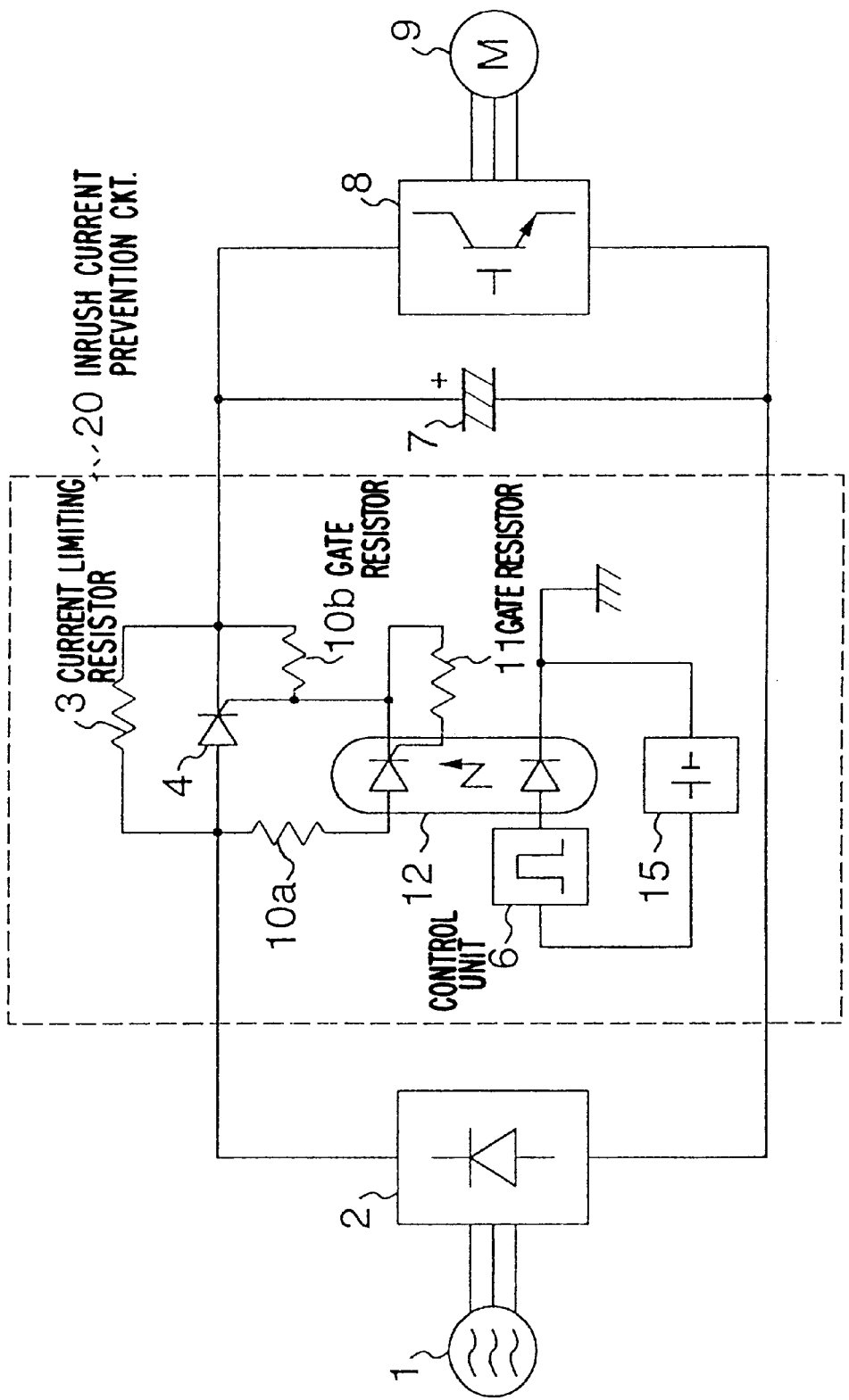
FIG. 1 is a circuit diagram showing a inrush current prevention circuit provided in the conventional inverter device.
Figure 2:
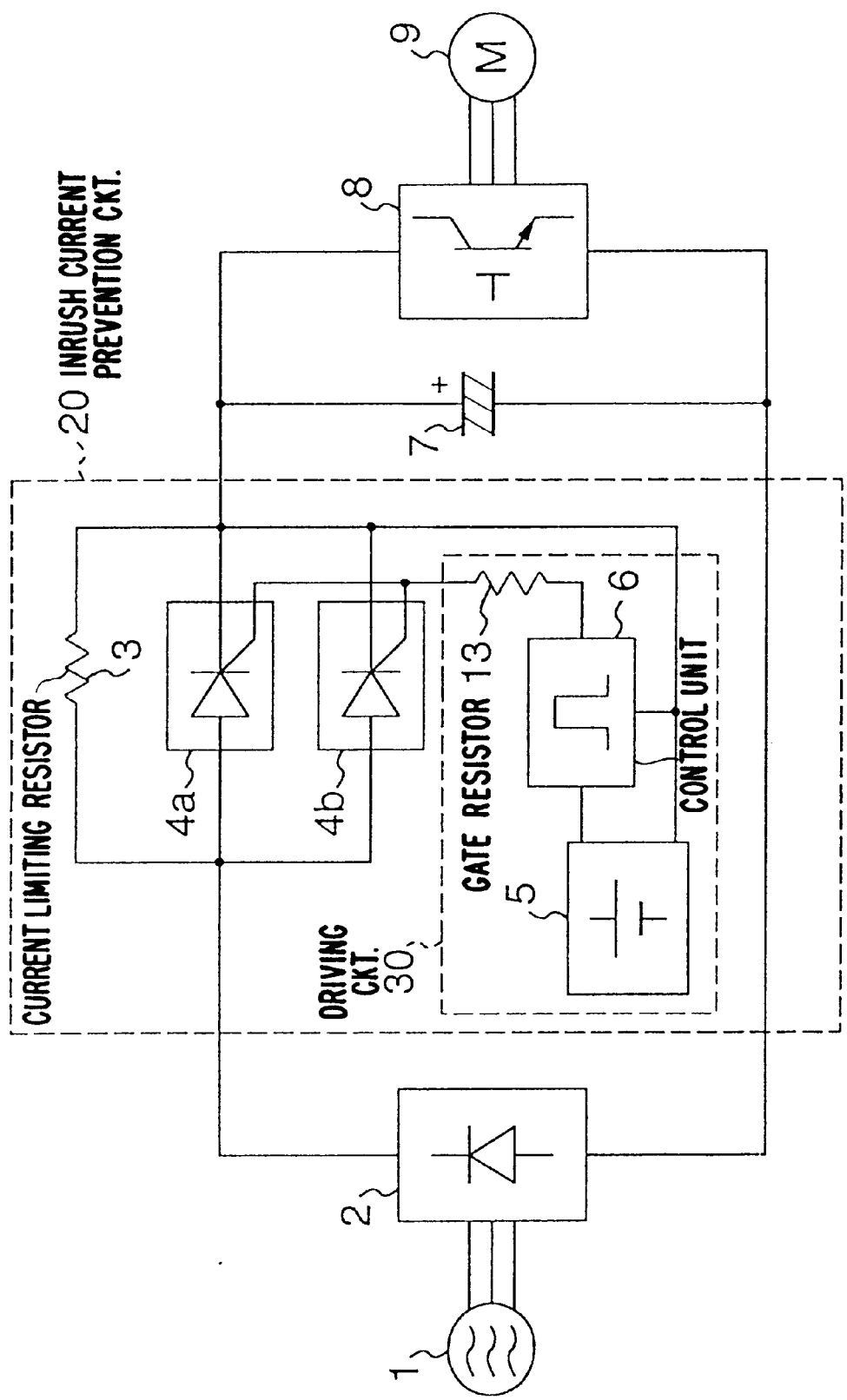
FIG. 2 is a circuit diagram showing a motor driving device according to a first embodiment of the invention.
Figure 3:
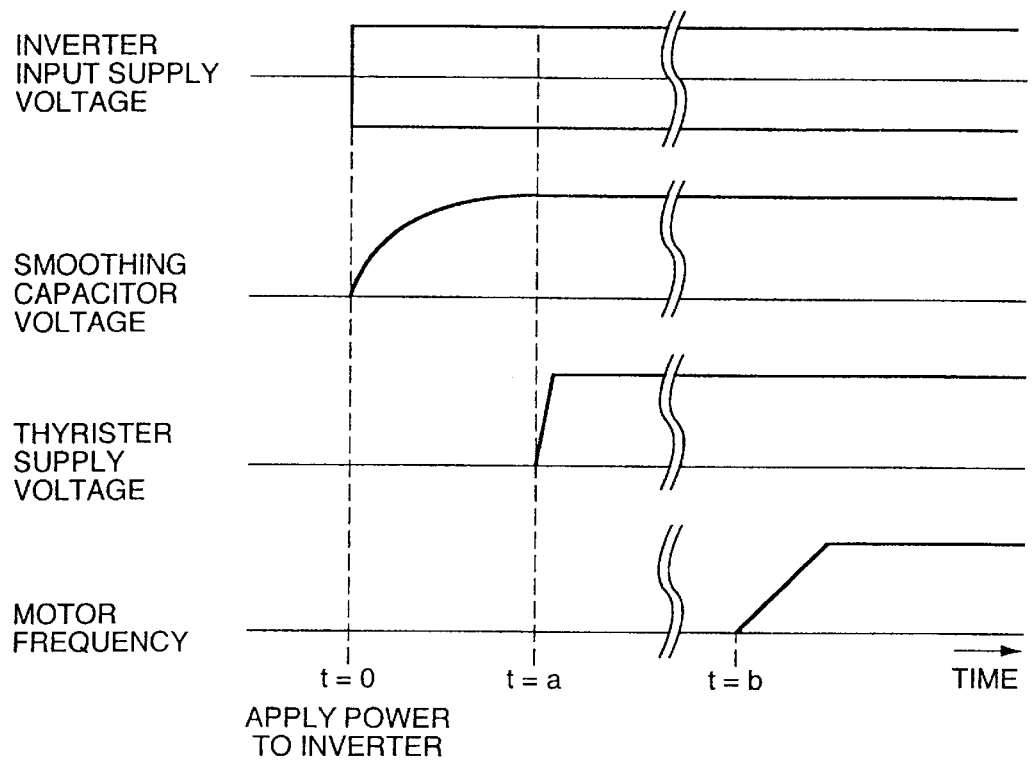
FIG. 3 is a time chart for describing the operation of the motor driving device shown in FIG. 2.
Figure 4:
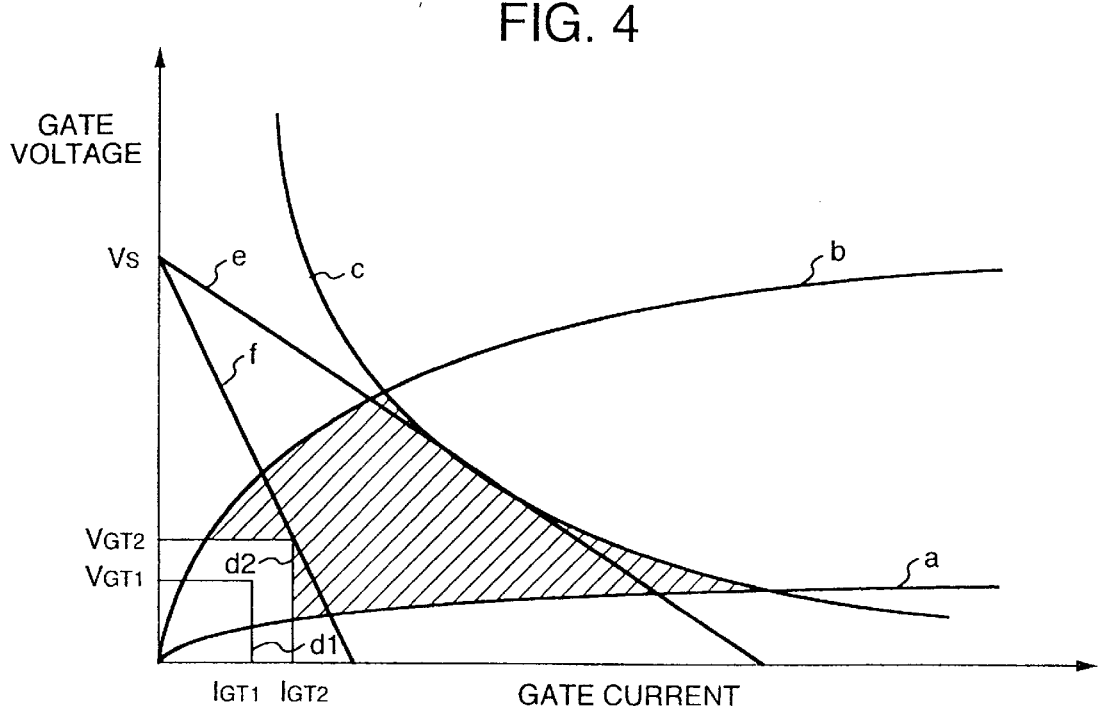
FIG. 4 is a thyristor gate characteristic graph for illustrating the relationship between the supply voltage of the DC power supply for the inrush current prevention circuit and the resistance of the gate resistor in the inrush current prevention circuit provided in the motor driving device shown in FIG. 2.

The first embodiment of the present invention will be described with reference to FIGS. 2 to 4. FIG. 2 is a circuit diagram showing the first embodiment of the motor driving device. FIG. 3 is a time chart for describing the operation of the motor driving device shown in FIG. 2. FIG. 4 is a thyristor gate characteristic graph for describing the relationship between the supply voltage of the DC power supply for the inrush current prevention circuit and the resistance of the gate resistor in the inrush current prevention circuit provided in the motor driving device shown in FIG. 2.

In FIG. 2, a reference number 1 denotes an AC power supply. A reference number 2 denotes a rectifying circuit composed of diodes connected in a three-phase bridge. A reference number 3 denotes a current-limiting resistor. Reference numbers 4a and 4b denote thyristors. A reference number 5 denotes a DC power supply for an inrush current prevention circuit which serves as a power supply for driving the thyristor. A reference number 6 denotes a control unit for the inrush current prevention circuit. A reference number 7 denotes a smoothing circuit. A reference number 8 denotes an inverter section. A reference number 9 denotes a motor. A reference number 13 denotes a gate resistor. A reference number 20 denotes a inrush current prevention circuit. A reference number 30 denotes a driving circuit for the circuit.

In this embodiment, the AC power supply 1 is a commercial power supply and serves to supply a three-phase AC power. The rectifying circuit 2 serves to convert the three-phase AC power supplied from the AC power supply into direct current and composes the DC power supply for a main circuit. In FIG. 2, the rectifying circuit 2 is shown as a diode rectifying circuit. Alternatively, it may be a converter circuit. The inrush current prevention circuit 20 serves to prevent an inrush currant from flowing into the smoothing circuit 7 when the power is turned on, and is located between the rectifying circuit 2 and the smoothing circuit 7. The smoothing circuit 7, composed of a smoothing capacitor, serves to smooth the DC voltage outputted from the rectifying circuit 2 and the smoothed voltage is supplied to the inverter section 8. The inverter section 8 is composed of semiconductor switching elements such as IGBTs connected in a three-phase bridge. These semiconductor switching elements are turned on and off by a control circuit (not shown) for driving the motor 9. The motor 9 is a three-phase induction type motor. Further, the rectifying circuit 2, the thyristors 4a and 4b of the inrush current prevention circuit 20. and the inverter section 8 are integrated into a semiconductor module.

Next, the inrush current prevention circuit 20 will be concretely described.

The in rush current prevention circuit 20 includes a current-limiting resistor 3 composing a current-limiting means for limiting the inrush current into the smoothing circuit 7, thyristors 4a and 4b composing the semiconductor switching element for switching this current-limiting element, and a driving circuit 30 for the inrush current prevention circuit 30 composing a driving means for driving these thyristors 4a and 4b. The current-limiting resistor 3 and the thyristors 4a and 4b are connected in parallel. This parallel circuit is connected between the rectifying circuit 2 and the smoothing circuit 7. These thyristors 4a and 4b are connected in parallel to each other.

The driving circuit 30 for the inrush current prevention circuit includes a DC power supply 5 for the inrush current prevention circuit, a control unit 6 for the inrush current prevention circuit, and a gate resistor 13. The DC power supply 5 for the inrush current prevention circuit is a DC power supply with the cathode potential of the thyristors 4a and 4b as a reference potential. Like the DC power supply for the inverter device, the DC power supply 5 for the inrush current prevention circuit may be a switching power supply or a secondary cell such as a battery. In FIG. 2, since the thyristors 4a and 3b are used as the semiconductor switching element of the inrush current prevention circuit 20, by considering the convenience in driving the gate, the reference potential of the DC power supply 5 for the inrush current prevention circuit is set to the cathode side of the thyristors 4a and 4b. Alternatively, it may be set to another potential.

Next, the operation of the inrush current prevention circuit 20 will be described with reference to FIG. 3.

The inrush current prevention circuit 20 serves to prevent the inrush current from flowing into the smoothing circuit 7 when the power supply is turned on. When power is applied (t=0), the three-phase AC power is supplied as an inverter power supply. The inrush current, converted into the direct current by the rectifying circuit 2, flows through the current-limiting resistor 3 for gradually raising the voltage of the smoothing capacitor that corresponds to the voltage of the smoothing circuit 7. After a predetermined length of time has passed (t=a), when the voltage of the smoothing capacitor rises to a given voltage, the control unit 6 for the inrush current prevention circuit is operated so that the driving circuit 30 for preventing the inrush current may be driven. By this, the thyristors 4a and 4b are turned on so that the thyristor power voltage may rise. A predetermined length of time after the thyristors 4a and 4b have been turned on (t=b), the semiconductor switching element of the inverter 8 is driven so that the motor frequency may rise. As stated above, the driving circuit of the inverter section 8 has close relation with the control unit 6 for the inrush current prevention circuit of the semiconductor switching elements 4a and 4b of the inrush current prevention circuit 20. Hence, it is desirous that both may be controlled by the control device composed of the same CPU (Central Processing Unit).

Next, the description will be oriented to the supply voltage of the DC power supply 5 dedicated for the inrush current prevention circuit and the resistance of the gate resistor 13 with reference to FIG. 4

In FIG. 4, the abscissa axis denotes a gate current, while the ordinate axis denotes a gate voltage. The thyristor gate characters of curves a and b respectively indicate the lower limit and the upper limit in the characteristic variety of the commonly used thyristor. Further, a gate loss characteristic curve c indicates a maximum value of a gate loss of the commonly used thyristor. The gate trigger current and voltage d1 and d2 respectively indicate the gate trigger current and the gate trigger voltage in the different ambient temperatures at which the inverter device is used. Normally, as the temperature is made lower, the gate trigger current and the gate trigger voltage are made larger as shown by d2. That is, assuming that the gate trigger current and the gate trigger voltage at a room temperature are IGTL and VGTI respectively and the gate trigger current and the gate trigger voltage at a low temperature are IGT2 and VGT2 respectively, IGTI<IGT2 and VGTI<VGT2 are established.

Herein, assuming that the gate trigger current and the gate trigger voltage of the thyristors 4a and 4b for a lower limit value of the temperature at which the inverter device is used are IGT2 and VGT2 respectively, a load line for positively operating the thyristors 4a and 4b is required to pass through an oblique line area of FIG. 4 without discontinuity. That is, the semiconductor switching elements 4a and 4b are required to be ignited in the range of the predetermined ambient temperature of the inverter device. Assuming that the supply voltage of the DC power supply 5 dedicated for the inrush current prevention circuit is Vs, the load line continuously passing through the oblique line area is located in the range of a load line e and a load line The minimal value of the gate resistance 13 is obtained from the load line e, while the maximum value of the gate resistance is obtained from the load line f. In the actual circuit design, the supply voltage value and the gate resistance are determined in consideration of the fluctuation of the supply voltage and the variety of the resistance. If a resistor is connected between the gate and the cathode of the thyristor, it is necessary to consider the current flowing through this resistor in designing the circuit.

Further, the thyristors 4a and 4b are connected in parallel. Hence, the gate current is required to be fed to both the thyristors 4a and 4b, —All the connected thyristors are required to be in the range of the load line —e and the load line f. The thyristors 4a and 4b may have different gate characteristics from each other if both have the common range where they may be positively operated.

According to the foregoing embodiment of the invention, the inrush current prevention circuit 20 provides semiconductor switching elements 4a and 4b which are connected in parallel to each other Hence, these semiconductor switching elements 4a and 4b may apply to the inrush current prevention circuit of the inverter device with a large capacitance. The resulting inverter device is inexpensive and highly reliable.

The inrush current prevention circuit 20 provides semiconductor switching elements 4a and 4b, which may be connected in series to each other. This series connection serves to lower the voltage of each of the semiconductor switching elements 4a and 4b. Further, the series and parallel connection of the semiconductor switching elements of the inrush current prevention circuit 20 may offer the effects caused by the series connection and the parallel connection.

Further, the semiconductor switching elements 4a and 43b of the inrush current prevention circuit 20 are connected in parallel and the driving circuit 30 for the inrush current prevention circuit provides the DC power supply for the inrush current prevention circuit. Hence, even if there are differences between the semiconductor switching elements 4a and 4b, the DC power supply 5 for the inrush current prevention circuit serves to positively drive the semiconductor switching elements 4a and 4b and allow the semiconductor switching elements 4a and 4b to supply the inverter device with large power capacity.

Moreover, the driving circuit 30 for the inrush current prevention circuit includes the DC power supply 5 for the inrush current prevention circuit and the gate resistor 13 serving as a current-limiting resistor. The DC power supply 5 for the inrush current prevention circuit is connected to the trigger terminals of the semiconductor switching elements 4a and 4b through the gate resistor 13, so that the semiconductor switching elements 4a and 4b may be positively operated.

The driving circuit 30 for the inrush current prevention circuit includes the DC power supply 5 for the inrush current prevention circuit and the gate resistor 13. The voltage value of the DC power supply 5 and the resistance of the gate resistor 13 may be set so that both of the semiconductor switching elements 4a and 4b may be turned on in the range of the predetermined ambient temperature of the inverter device. Hence, the semiconductor switching elements 4a and 4b may be positively operated.

Figure 5:
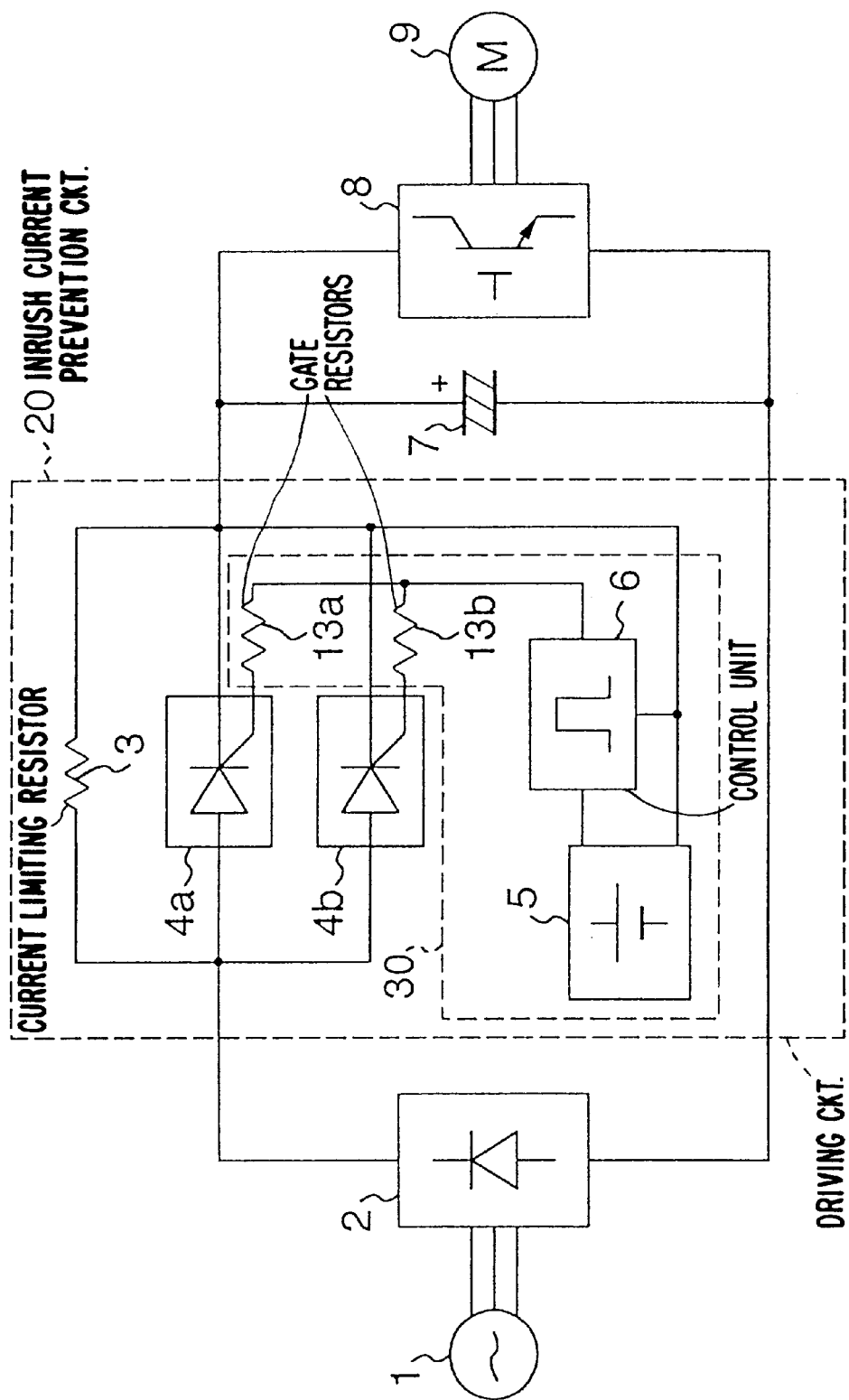
FIG. 5 is a circuit diagram showing a motor driving device according to a second embodiment of the invention.

In turn, the second embodiment of the invention will be described with reference to FIG. 5. FIG. 5 is a circuit diagram showing a motor driving device according to a second embodiment of the invention.

In FIG. 5, 13a and 13b denote gate resistors. The second embodiment is different from the first embodiment with respect to the inserting locations and the number of the gate resistors 13a and 13b of the inrush current prevention circuit 20. That is, in the first embodiment, the gate resistor 13 is located for a group of thyristors connected in parallel, while in the second embodiment, the gate resistors 13a and 13b are located respectively for the gates of the thyristors 4a and 4b.

The module type thyristors 4a and 4b has a smaller variation to the rated current. Hence, for obtaining the target rated current, it is considered that the thyristors with respective rated currents are connected in parallel. In such a case, it is presumed that those thyristors have respective thyristor gate characteristics. Like the first embodiment, in the case of locating the gate resistor 13 for all the thyristors, all the thyristor gate characteristics may not enter into the area where those thyristors are positively operated. Hence, like the second embodiment, the gate resistors 13a and 13h designed differently are connected in series to the gates of the thyristors 4a and 4b so that the thyristors 4a and 4b with respective gate characteristics may be connected in parallel.

According to the foregoing embodiment of the invention, the driving circuit 30 for the inrush current prevention circuit includes the DC power supply 5 for the inrush current prevention circuit and gate resistors 13 served as a plurality of current-limiting resistors. The DC power supply 5 for the circuit is connected to the trigger terminals of the semiconductor switching elements 4a and 4b through the corresponding gate resistors 13. This connecting arrangement allows the semiconductor switching elements 4a and 4b with different gate characteristics to be connected in parallel.

Figure 6:
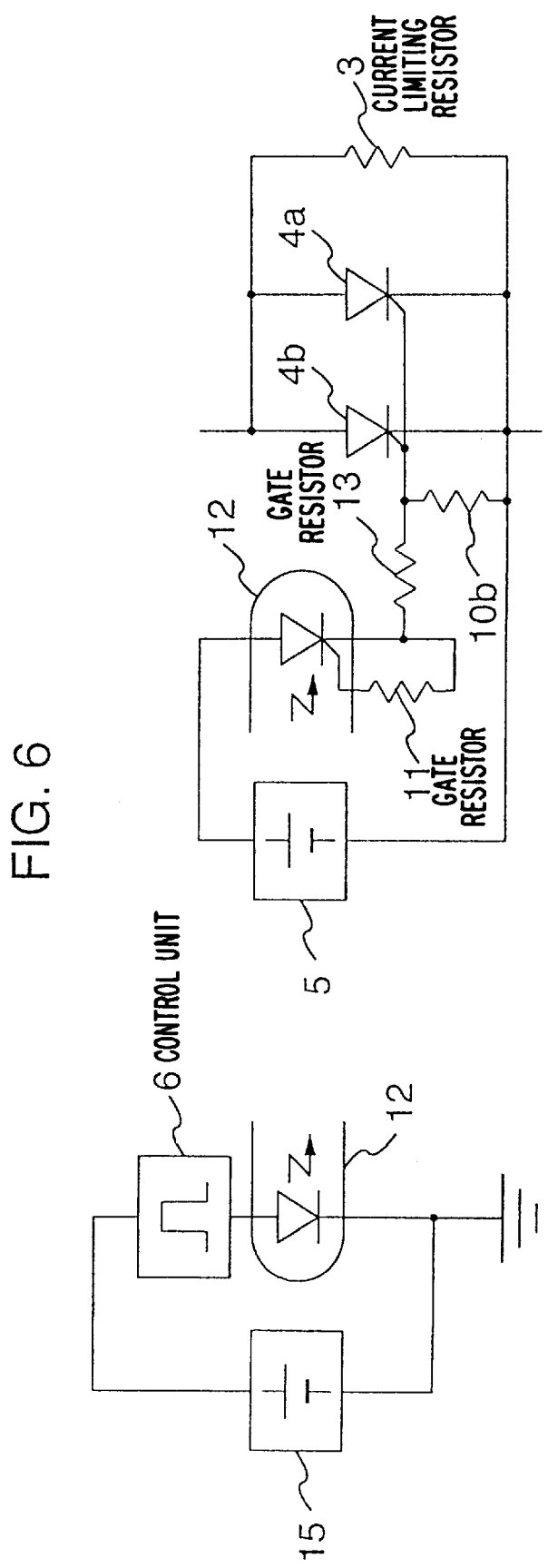
FIG. 6 is a circuit diagram showing a inrush current prevention circuit included in a motor driving device according to a third embodiment of the invention.

Next, the description will be oriented to the third embodiment of the invention with reference to FIG. 6. FIG. 6 is a circuit diagram showing a inrush current prevention circuit in accordance with a third embodiment of the invention.

In FIG. 6, reference number 3 denotes a current-limiting resistor. Reference numbers 4a and 4b denote thyristors. Reference numbers 5 denotes a DC power supply for the inrush current prevention circuit. Reference number 6 denotes a control unit for the inrush current prevention circuit. Reference number 10b denotes a resistor between the gate and the cathode. Reference number 11 denotes a gate resistor for a photo thyristor. Reference number 12 denotes a photo thyristor. Reference number 13 denotes a gate resistor. Reference number 15 denotes a DC power supply for the circuit control unit.

The difference between of the third embodiment and the first embodiment is as follows. The lightreceiving side of the photo thyristor 12 is connected between the DC power supply 5 for the circuit and the gate resistor 13. The gate resistor 11 for the photo thyristor is connected between the gate of the photo thyristor 12 and the gate resistor 13. The photo thyristor 12 provides the inrush current prevention circuit control unit 6 and the DC power supply 15 for the inrush current prevention circuit control unit on the light-emitting side thereof. In the third embodiment, the inrush current prevention circuit control unit 6 may be insulated from the thyristors 4a and 4b on their gates by means of the photo thyristor 12.

Herein, the photo thyristor 12 is used in the insulating circuit. If the necessary current to driving the gate of the thyristor may be secured, the normal photo coupler or the combination of a buffer circuit and the normal photo coupler may be used for that purpose. Further, as shown in FIG. 5, the thyristor resistor may be located for each thyristor gate.

In the foregoing embodiments, the thyristor is used as a semiconductor switching element included in the inrush current prevention circuit. Alternatively, another semiconductor switching element such as IGBT or GTO (Gate Turn Off thyristor) may be used. Further, it is illustrated in those embodiments that two thyristors are connected in parallel. In place, the present invention may apply to the parallel connection of three thyristors. Moreover, the inverter section may be composed of multilevel inverter stages such as twolevel and three-level inverter stages.

According to the invention, the semiconductor switching element may apply to the inrush current prevention circuit of the inverter device with a large capacitance, so that the resulting inverter device may be inexpensive and highly reliable.

What is claimed is:

1. An inverter device comprising:
    a smoothing circuit for smoothing current of a power supply for a main circuit;
    an inrush current prevention circuit for preventing an inrush current from flowing into said smoothing circuit when said power supply for said main circuit is turned on; and
    an inverter section which receives current from said smoothing circuit and drives a motor;
    said inrush current prevention circuit including means for limiting the inrush current, a plurality of semiconductor switching elements, and an inrush current prevention driving circuit for driving said plurality of semiconductor switching elements;
    wherein said plurality of semiconductor switching elements of said inrush current prevention circuit are connected in parallel to each other.

2. An inverter device as claimed in claim 1, wherein said inrush current prevention driving circuit includes a DC power supply for the inrush current prevention circuit and a current-limiting resistor, wherein an output voltage of said DC power supply for said inrush current prevention circuit and a resistance of said current-limiting resistor are set so that all of the semiconductor switching elements are turned on in a predetermined ambient temperature range of said inverter device.

3. An inverter device comprising:
a smoothing circuit for smoothing current of a power supply for a main circuit;
a an inrush current prevention circuit for preventing inrush current from flowing into said smoothing circuit when said power supply for the main circuit is turned on; and
an inverter section which receives current from said smoothing circuit and drives a motor;
said inrush current prevention circuit including means for limiting the inrush current, a plurality of semiconductor switching elements, and an inrush current prevention circuit driving circuit for driving said plurality of semiconductor switching elements;
wherein said plurality of semiconductor switching elements of said inrush current prevention circuit are connected in parallel to each other and wherein said inrush current prevention driving circuit provides DC power for said inrush current prevention circuit.

4. An inverter device comprising:
a smoothing circuit for smoothing current of a power supply for a main circuit;
an inrush current prevention circuit for preventing an inrush current from flowing into said smoothing circuit when said power supply for the main circuit is turned on; and
an inverter section which receives current from said smoothing circuit and drives a motor;
said inrush current prevention circuit including means for limiting the inrush current, a plurality of semiconductor switching elements, and an inrush current prevention circuit driving circuit for driving said plurality of semiconductor switching elements, wherein said plurality of semiconductor switching elements of said inrush current prevention circuit are connected in parallel, and wherein said inrush current prevention circuit driving circuit has a DC power supply for said inrush current prevention circuit and a current-limiting resistor, and wherein said DC power supply for said inrush current prevention circuit is connected to a trigger terminal of said semiconductor switching element through said current-limiting resistor.

5. An inverter device comprising:
a smoothing circuit for smoothing current of a power supply for a main circuit;
an inrush current prevention circuit for preventing an inrush current from flowing into said smoothing circuit when said power supply for the main circuit is turned on; and
an inverter section which receives current from said smoothing circuit and drives a motor;
said inrush current prevention circuit including means for limiting the inrush current, a plurality of semiconductor switching elements, and an inrush current prevention driving circuit for driving said plurality of semiconductor switching elements, said plurality of semiconductor switching elements of said inrush current prevention circuit being connected in parallel to each other, wherein said inrush current prevention driving circuit has an inrush current prevention circuit DC power supply and a plurality of current-limiting resistors, and wherein said DC power supply for said inrush current prevention circuit is respectively connected to a trigger terminal of said plurality of semiconductor switching elements through said plurality of current-limiting resistors.

6. An inverter device as claimed in claim 2, wherein said DC power supply for said inrush current prevention circuit is further connected to trigger terminals of said semiconductor switching elements through an insulating circuit.

7. An inverter device as claimed in any one of claims 3 to 5, wherein said DC power supply for said inrush current prevention circuit is further connected to trigger terminals of said semiconductor switching elements through an insulating circuit.

8. An inverter device as claimed in claim 6, wherein said insulating circuit is a photo thyristor or a photo coupler.

9. A motor driving device including a motor, an inverter device, and a control device, said inverter comprising:
a smoothing circuit for smoothing current of a power supply for a main circuit; an inrush current prevention circuit for preventing an inrush current from flowing into said smoothing circuit when said power supply for the main circuit is turned on; and
an inverter section which receives current from said smoothing circuit and drives a motor;
said inrush current prevention circuit including means for limiting the inrush current, a plurality of semiconductor switching elements, and an inrush current prevention circuit driving circuit for driving said plurality of semiconductor switching elements, wherein said plurality of semiconductor switching elements of said inrush current prevention circuit are connected in parallel to each other, said inrush current prevention circuit driving circuit having a DC power supply for said inrush current prevention circuit and a current-limiting resistor, and wherein said DC power supply for said inrush current prevention circuit is connected to a trigger terminal of said semiconductor switching element through said current-limiting resistor, and wherein said control device controls said inverter section and said inrush current prevention circuit driving circuit.

* * * * *